US012606685B2

(12) United States Patent
Brown et al.

(10) Patent No.: US 12,606,685 B2
(45) Date of Patent: Apr. 21, 2026

(54) EXTRUDED NON-CROSSLINKED POLYETHYLENE FOAM

(71) Applicant: Total American Services, Inc., Houston, TX (US)

(72) Inventors: Jayna Brown, Houston, TX (US); Leonardo Cortes Rodriguez, League City, TX (US); Fengkui Li, Houston, TX (US)

(73) Assignee: TOTAL AMERICAN SERVICES, INC., Houston, TX (US)

( * ) Notice: Subject to any disclaimer, the term of this patent is extended or adjusted under 35 U.S.C. 154(b) by 93 days.

(21) Appl. No.: 17/349,002

(22) Filed: Jun. 16, 2021

(65) Prior Publication Data

US 2021/0395480 A1      Dec. 23, 2021

Related U.S. Application Data

(60) Provisional application No. 63/042,429, filed on Jun. 22, 2020.

(51) Int. Cl.
| | |
|---|---|
| *C08J 9/12* | (2006.01) |
| *C08J 9/00* | (2006.01) |
| *C08J 9/06* | (2006.01) |
| *C08J 9/14* | (2006.01) |

(52) U.S. Cl.
CPC ............. *C08J 9/122* (2013.01); *C08J 9/0061* (2013.01); *C08J 9/06* (2013.01); *C08J 9/141* (2013.01); *C08J 9/146* (2013.01); *C08J 2201/03* (2013.01); *C08J 2203/06* (2013.01); *C08J 2203/142* (2013.01); *C08J 2205/052* (2013.01); *C08J 2323/06* (2013.01)

(58) Field of Classification Search
CPC . C08J 9/32; C08J 9/0023; C08J 9/0061; C08J 9/0095; C08J 2201/026; C08J 2203/22; C08J 2323/06; C08J 2423/08; B29C 35/0805; B29C 44/3415; B29C 44/42; B29C 2035/0877; B29K 2023/0641; B29K 2023/083; B29K 2105/0026; B29K 2105/0076; B29K 2105/048; B29K 2105/24; B29K 2223/083; B29K 2995/0002; B29K 2995/0015; B29K 2995/0077

See application file for complete search history.

(56) References Cited

U.S. PATENT DOCUMENTS

| | | | | |
|---|---|---|---|---|
| 5,225,451 | A | * 7/1993 | Rogers | C08J 9/141 |
| | | | | 525/76 |
| 6,140,379 | A | 10/2000 | Yang et al. | |
| 2003/0232898 | A1* | 12/2003 | Van Der Ven | F16L 59/02 |
| | | | | 521/142 |
| 2005/0124709 | A1* | 6/2005 | Krueger | A61L 15/48 |
| | | | | 521/50 |
| 2010/0196641 | A1 | 8/2010 | De Vos et al. | |
| 2018/0127572 | A1* | 5/2018 | Gerrits | C08J 3/28 |

FOREIGN PATENT DOCUMENTS

| | | | | |
|---|---|---|---|---|
| EP | 1646677 A1 * | 7/2007 | ............... | C08J 5/18 |
| WO | WO-9527005 A1 * | 10/1995 | .......... | C08L 23/0815 |
| WO | WO-9951667 A1 * | 10/1999 | ............ | C08J 9/0061 |
| WO | WO-2008145267 A1 * | 12/2008 | ............ | C08J 9/0061 |

OTHER PUBLICATIONS

Matweb, Total Lumicene® mPE M 2310 EP Metallocene Polyethylene (Year: 2016).*
"Plastazote MP45 Metallocene Polyethylene Foam Data Sheet" *Zotefoams* 2005.

* cited by examiner

*Primary Examiner* — Jeffrey S Lenihan
(74) *Attorney, Agent, or Firm* — NORTON ROSE FULBRIGHT US LLP

(57) ABSTRACT

Disclosed is an extruded non-crosslinked polyethylene foam containing a metallocene polyethylene, a density of 0.35 g/cc or less, and a closed cell content higher than 70%, methods of making the extruded non-crosslinked polyethylene foam and articles containing the extruded non-crosslinked polyethylene foam.

12 Claims, 1 Drawing Sheet

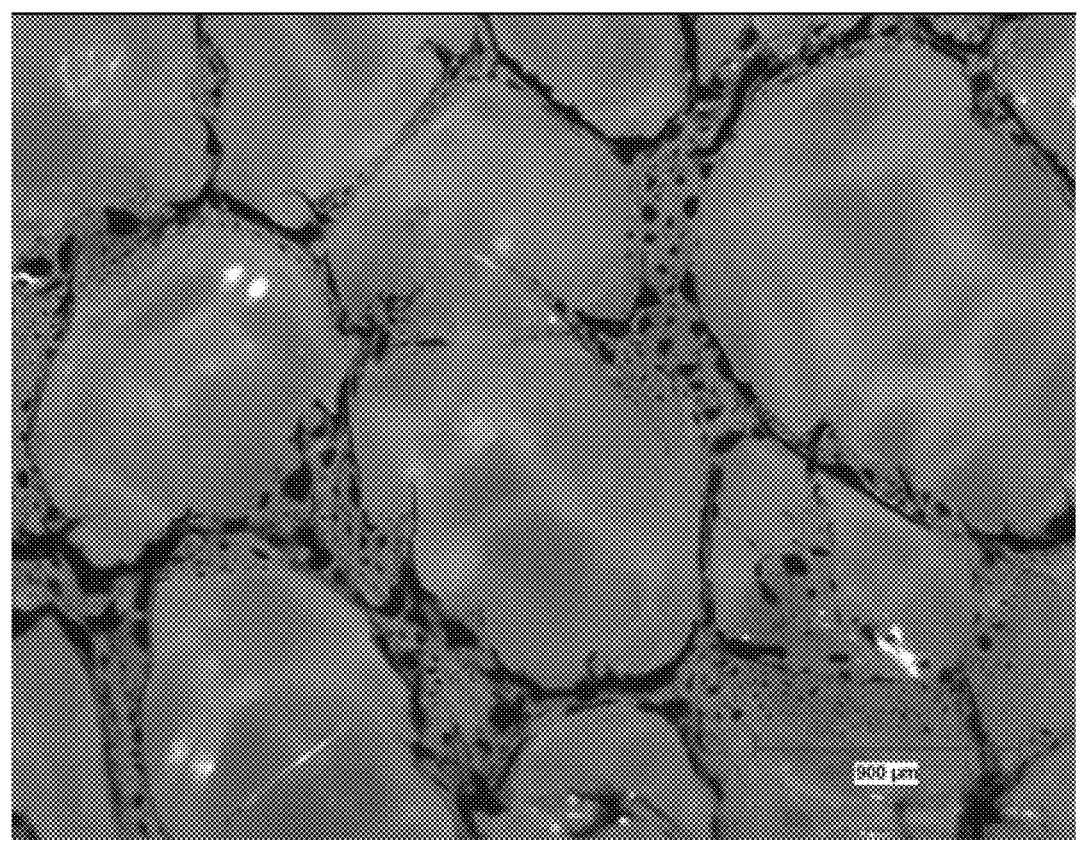

EXTRUDED NON-CROSSLINKED POLYETHYLENE FOAM

CROSS REFERENCE TO RELATED APPLICATIONS

This application claims the benefit of U.S. Provisional Patent Application No. 63/042,429, filed Jun. 22, 2020, which is incorporated by reference in its entirety for all purposes.

BACKGROUND OF THE INVENTION

A. Field of the Invention

The invention generally concerns extruded non-crosslinked polyethylene foams. In particular, the invention concerns extruded non-crosslinked polyethylene foams having a density of 0.35 g/cc or less and a closed cell content higher than 70% comprising at least 5 wt. % of a metallocene polyethylene.

B. Description of Related Art

Polyethylene foams are light weight, water resistant, impact resistant, and thermal insulating material. Low density polyethylene (LDPE) polymers and/or crosslinked polyethylene polymers are generally used to make polyethylene foams having relatively low density. Low density polyethylene foams are used for packaging, construction, insulation, and recreational applications among others. However, this polyethylene foam primarily made from LDPE polymer can have relatively low compression strength and compression modulus.

SUMMARY OF THE INVENTION

A discovery has been made that provides a solution to at least some of the aforementioned problems. In one aspect, the solution includes an extruded non-crosslinked polyethylene foam having a density of 0.35 g/cc or less and a closed cell content higher than 70% comprising a metallocene polyethylene. This foam can include at least 31, 40, 50, 60, 70, 80, 90 or at least 95 wt. % of a metallocene polyethylene. As illustrated in a non-limiting manner in the Examples, an extruded non-crosslinked polyethylene foam containing at least 31 wt. % of a metallocene polyethylene can have low density, high closed cell content and relatively high compression strength and compression modulus.

One aspect of the present invention is directed to an extruded non-crosslinked polyethylene foam. The extruded non-crosslinked polyethylene foam can contain at least 31, 35, 40, 45, 50, 55, 60, 65, 70, 75, 80, 85, or 90 wt. %, of a metallocene polyethylene. In some aspects, the extruded non-crosslinked polyethylene foam can contain 20 wt. % to 60 wt. % of a low density polyethylene (LDPE). The density of the extruded non-crosslinked polyethylene foam can be 0.35 g/cc or less, or less than 0.25 g/cc, or 0.02 to 0.2 g/cc. The closed cell content of the extruded non-crosslinked polyethylene foam can be 70% or higher. The extruded non-crosslinked polyethylene foam of the present invention can have a compression strength higher, such as 10% or more higher than the compression strength of a polyethylene foam such as an extruded non-crosslinked polyethylene foam containing 90 wt. % or more of a LDPE polymer instead of the metallocene polyethylene. The extruded non-crosslinked polyethylene foam can have a compression modulus higher, such as 10% or more higher than the compression modulus of a polyethylene foam such as an extruded non-crosslinked polyethylene foam containing 90 wt. % or more of a LDPE polymer instead of the metallocene polyethylene. In some aspects, the extruded non-crosslinked polyethylene foam can have a compression strength of 30 to 100 psi as measured by ASTM D3575. In some aspects, the extruded non-crosslinked polyethylene foam can have a compression modulus of 1500 to 3500 psi as measured by ASTM D3575. The metallocene polyethylene (e.g. in a non-expanded state) can have a density of 0.9 g/cc to 0.965 g/cc, or 0.918 g/cc to 0.945 g/cc, or 0.922 g/cc to 0.93 g/cc as measured in accordance with ASTM D792. The metallocene polyethylene (e.g. in a non-expanded state) can have a melt index ($MI_2$) of 0.1 to 30 g/10 min, or 0.1 to 20 g/10 min, 0.2 to 5.5 g/10 min at 2.16 kg, 190° C. as measured in accordance with ASTM D1238. The metallocene polyethylene can have a melting point of 105° C. to 135° C. as measured by Differential Scanning calorimeter (DSC) by ASTM method D3418-15 at a heating rate of 10° C./minute. In some aspects, the metallocene polyethylene can have a density of 0.922 g/cc to 0.93 g/cc as measured in accordance with ASTM D792 and a $MI_2$ of 0.3 to 0.6 g/10 min. at 2.16 kg, 190° C. as measured in accordance with ASTM D1238. In some aspects, the metallocene polyethylene can have a density of 0.922 g/cc to 0.93 g/cc as measured in accordance with ASTM D792 and a $MI_2$ of 0.6 to 1.3 g/10 min. at 2.16 kg, 190° C. as measured in accordance with ASTM D1238. In some aspects, the metallocene polyethylene can have a density of 0.922 g/cc to 0.93 g/cc as measured in accordance with ASTM D792 and a $MI_2$ of 1.3 to 3.5 g/10 min. at 2.16 kg, 190° C. as measured in accordance with ASTM D1238. In certain aspects, the metallocene polyethylene has a density of 0.922 g/cc to 0.93 g/cc as measured in accordance with ASTM D792 and a $MI_2$ of to 3.5 to 5.5 g/10 min. at 2.16 kg, 190° C. as measured in accordance with ASTM D1238. In some aspects, the metallocene polyethylene can be a blend of two or more metallocene polyethylenes having different density and/or melt index. The LDPE (e.g. in a non-expanded state) can have a density of 0.915 g/cc to 0.925 g/cc. Certain embodiments are directed to a composition (e.g. an article) containing and/or made of the extruded non-crosslinked polyethylene foam.

One aspect of the present invention is directed to a method for preparing an extruded non-crosslinked polyethylene foam. The method can include forming an extrudable composition containing a metallocene polyethylene and optionally an LDPE melt and a blowing agent; and extruding the extrudable composition through a die to form the extruded non-crosslinked polyethylene foam. In some particular aspects, the extrudable composition can contain at least 30, 35, 40, 45, 50, 55, 60, 65, 70, 75, 80, 85, 90 or 95 wt. % of the metallocene polyethylene and 20 wt. % to 60 wt. % of the LDPE polymer. The blowing agent can be a chemical blowing agent or a physical blowing agent. In some aspects, the physical blowing agent can contain carbon dioxide ($CO_2$), a hydrocarbon, nitrogen ($N_2$), a hydrofluorocarbon (HFC), a hydrofluoroolefin (HFO), or any combination or blends thereof. In some aspects, the chemical blowing agent can contain hydrocerol, a bicarbonate such sodium bicarbonate and/or zinc bicarbonate, a nitrogen containing blowing agent such as azodicarbonamide, or any combination thereof. In some particular aspects, the blowing agent can be $CO_2$. The extrudable composition can contain less than 10 wt. %, such as 0.25 wt. % to 3 wt. % of the blowing agent, such as $CO_2$. In some aspects, the extrudable composition can further contain a nucleating agent. In some particular aspects, the nucleating agent can be talc, clay, PTFE, a chemical blowing agent, or any combination or blends thereof. In some particular aspects, the extrudable composition can contain 0.1 wt. % to 4 wt. % of the nucleating agent, such as talc, clay, PTFE, a chemical blowing agent, or any combination or blends thereof. In some aspects, the extrudable composition can further include an additive selected from the group an antioxidant, a processing aid, a plasticizer, a flow modifier, or any combination or blends thereof. In some particular aspects, the extrudable composition can contain 0.001 wt. % to 4 wt. % of the additive. In some aspects, the polymer melt in the extrudable composition can be at a temperature 220° F. to 280° F. and/or pressure 350 to 3000 psi before extrusion and can be extruded to ambient temperature and pressure through the die to form the extruded foam. In some particular aspects, the extrudable composition can be formed by heating a composition containing a metallocene polyethylene and optionally a LDPE polymer to melt the polymer and form a polymer melt, and dissolving and/or mixing a physical blowing agent such as $CO_2$ to the polymer melt to form the extrudable composition. In some particular aspects, the extrudable composition can be formed by heating a composition containing the metallocene polyethylene, the chemical blowing agent and optionally the LDPE polymer to melt the polymer(s) and decompose the chemical blowing agent to form the extrudable composition, where gas from decomposed chemical blowing agent gets dissolved and/or mixed in the melted metallocene polymer forming the extrudable composition. In some aspects, the extrusion method for preparing an extruded non-crosslinked polyethylene foam does not include a cross-linking agent, e.g. no cross-linking agent is added to the extrudable composition and/or the extrudable composition does not contain or is substantially free of a cross-linking agent. In some aspects, the cross-linking not used can include peroxide cross-linking, radiation cross-linking, and/or silane cross-linking agent.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions and systems of the invention can be used to achieve methods of the invention.

The following includes definitions of various terms and phrases used throughout this specification.

The term "non-crosslinked" refers to polyethylene foams that have not gone through a secondary cross-linking process such as peroxide cross-linking, radiation cross-linking, and/or silane cross-linking process.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refer to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification include any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" can include "and" or "or." To illustrate, A, B, and/or C can include: A alone, B alone, C alone, a combination of A and B, a combination of A and C, a combination of B and C, or a combination of A, B, and C.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process and systems of the present invention can "comprise," "consist essentially of," or "consist of" particular ingredients, components, compositions, steps, etc. disclosed throughout the specification. With respect to the transitional phrase "consisting essentially of," in one non-limiting aspect, a basic and novel characteristic of the composition, and processes the present invention are extruded non-crosslinked polyethylene foams containing a metallocene polyethylene (at least 31 wt. % of a metallocene polyethylene) and having a density of 0.35 g/cc or less and a closed cell content higher than 70%.

Other objects, features and advantages of the present invention will become apparent from the following FIGURES, detailed description, and examples. It should be understood, however, that the FIGURES, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

FIG. 1 Cell structure of an extruded non-crosslinked polyethylene foam according to an example of the present invention, magnification 250×.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to at least some of the aforementioned problems associated with polyethylene foams. As illustrated in a non-limiting manner in the Examples, the metallocene polyethylene containing extruded foams of the present invention have similar density but relatively higher compression strength and modulus compared to a foam containing 90 wt. % or more of a non-metallocene polyethylene.

These and other non-limiting aspects of the present invention are discussed in further detail in the following sections.

A. Extruded Non-Crosslinked Polyethylene Foam and Compositions Containing the Extruded Non-Crosslinked Polyethylene Foam The extruded non-crosslinked polyethylene foam can contain 31 wt. % to 98 wt. % or 31 wt. % to 100 wt. % at least any one of, equal to any one of, or between any two of 31 wt. %, 40 wt. %, 50 wt. %, 60 wt. %, 70 wt. %, 80 wt. %, 90 wt. %, 95 wt. %, 98 wt. %, and 100 wt. % of a metallocene polyethylene. The extruded non-crosslinked polyethylene foam can optionally contain 0 wt. % to 69 wt. % or at least any one of, equal to any one of, or between any two of 20 wt. %, 30 wt. %, 40 wt. %, 50 wt. %, 60 wt. %, and 60 wt. %, of a metallocene LDPE. The extruded non-crosslinked polyethylene foam containing 31 to 100 wt. %, of a metallocene polyethylene and optionally 0 wt. % to 69 wt. % of a LDPE polymer refers to an extruded non-crosslinked polyethylene foam is prepared by blowing a composition containing at least 31 wt. % or 100 wt. %, of the metallocene polyethylene and optionally 0 wt. % to 69 wt. % of the LDPE polymer respectively. The extruded non-crosslinked polyethylene foam can have a density less than 0.35 g/cc or less, or less than 0.25 g/cc, or 0.02 to 0.2 g/cc or at least any one of, equal to any one of, or between any two of 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.25, 0.3, 0.35 g/cc. The extruded polymer foam can have open and closed cells. The polyethylene foam can have a closed cell content 70% or higher, or higher than 80%, or 85% to 95% or at least any one of, equal to any one of, or between any two of 70, 75, 80, 85, 86, 87, 88, 89, 90, 91, 92, 93, 94, and 95%. Foams having high closed cell content can have relatively better thermal insulation properties and compression strength. In some aspects, the extruded non-crosslinked polyethylene foam can have an average cell size such as cell diameter of 0.5 mm to 2.5 mm or at least any one of, equal to any one of, or between any two of 0.5, 0.6, 0.7, 0.8, 0.9, 1, 1.1, 1.2, 1.3, 1.4 1.5, 2 and 2.5 mm. The extruded non-crosslinked polyethylene foam can have a relatively uniform cell size and homogeneous cell distribution. In some aspects, the extruded non-crosslinked polyethylene foam can contain 0.5 wt. % or less, such as less than 0.4 wt. %, less than 0.3 wt. %, less than 0.2 wt. %, less than 0.1 wt. %, or 0 wt. %, of a non-metallocene HDPE polymer. In some aspects, the extruded non-crosslinked polyethylene foam can contain 0.5 wt. % or less, such as less than 0.4 wt. %, less than 0.3 wt. %, less than 0.2 wt. %, less than 0.1 wt. %, or 0 wt. %, of a non-metallocene MDPE polymer.

The extruded non-crosslinked polyethylene foam can be of any suitable shape and/or size. Non limiting shapes includes sheet, roll, film, tube, sphere, cube, or cylinder with triangular, square, rectangle, pentagonal, or hexagonal cross-section. Extruded non-crosslinked polyethylene foam of other shapes can also be readily made. The extruded non-crosslinked polyethylene foam can have any suitable thickness. The extruded non-crosslinked polyethylene foam sheet can have any suitable length, width and/or thickness.

Certain embodiments are directed to a composition, for example, an article produced with and/or containing the extruded non-crosslinked polyethylene foam. Non-limiting examples of the article includes articles used in automotive, packing, packaging, electronic, construction, insulation, recreational, furniture and/or medical industries. The extruded non-crosslinked polyethylene foam can also be readily included in articles used in other industries.

B. Metallocene Polyethylene Used to Make the Extruded Non-Crosslinked Polyethylene Foam The metallocene polyethylene refers to a copolymer of ethylene and a α-olefin prepared using a metallocene catalyst. In some aspects, the α-olefin can have a carbon number of 4 to 10. Metallocene catalysts are single site catalysts and enables manufacture of polymers with relatively homogeneous properties. The metallocene polyethylenes can have a $M_w/M_n$ ratio of less than 3, or less than 2, where $M_w$ is weight average molecular weight and $M_n$ is number average molecular weight of the polymer. The metallocene polyethylene can have a density of 0.9 g/cc to 0.965 g/cc, or at least any one of, equal to any one of, or between any two of 0.9, 0.905, 0.91, 0.915, 0.92, 0.921 g/cc, 0.922 g/cc, 0.923 g/cc, 0.924 g/cc, 0.925 g/cc, 0.926 g/cc, 0.927 g/cc, 0.928 g/cc, 0.929 g/cc, 0.93 g/cc, 0.935 g/cc, 0.94 g/cc, 0.945 g/cc, 0.95 g/cc, 0.955 g/cc, and 0.96 g/cc, as measured in accordance with ASTM D792. The metallocene polyethylene can have a melt index ($MI_2$) of 0.1 to 30 g/10 min, or at least any one of, equal to any one of, or between any two of 0.1, 0.5, 1, 1.5, 2, 2.5, 3, 3.5, 4, 4.5, 5, 5.5, 6, 6.5, 7, 7.5, 8, 8.5, 9, 9.5, 10, 12, 14, 16, 18, 20, 22, 24, 26, 28 and 30 g/10 min at 2.16 kg, 190° C. as measured in accordance with ASTM D1238. The metallocene polyethylene can have a high load melt index (HLMI) of 2 to 600 g/10 min, at 21.6 kg, 190° C. as measured in accordance with ASTM D1238. In some aspects, the metallocene polyethylene can have a melting point of 105° C. to 135° C. or at least any one of, equal to any one of, or between any two of 105° C., 115° C., 125° C. and 135° C. as measured by Differential Scanning calorimeter (DSC) by ASTM method D3418-15 at a heating rate of 10° C./minute. In some aspects, the metallocene polyethylene can be a blend of two or more metallocene polyethylenes having different density and/or melt index. Examples of commercially available metallocene polyethylenes include Lumicene® mPE M2314EP, Lumicene® mPE M2710EP, Lumicene® mPE M3410EP, and Lumicene® mPE M4041UV among others.

C. Methods for Producing the Extruded Non-Crosslinked Polyethylene Foam

The extruded non-crosslinked polyethylene foam can be produced by an extrusion method. The extrusion method can include forming an extrudable composition containing a metallocene polyethylene and optionally a LDPE melt and a blowing agent and extruding the extrudable composition through a die to form the extruded non-crosslinked polyethylene foam. The extrusion can be performed with an extruder known in the art. In some aspects, the extruder can be a single screw extruder, or a twin screw extruder. In some aspects, the extruder can be a grooved barrel extruder or a smooth barrel extruder. The extrudable composition can contain 31 wt. % to 98 wt. % or at least any one of, equal to any one of, or between any two of 31 wt. %, 40 wt. %, 50 wt. %, 60 wt. %, 70 wt. %, 80 wt. %, 90 wt. %, and 98 wt. % of the metallocene polyethylene. In some aspects, the extrudable composition can contain 20 wt. % to 60 wt. % or at least any one of, equal to any one of, or between any two of 20 wt. %, 30 wt. %, 40 wt. %, 50 wt. %, and 60 wt. % of the LDPE. The metallocene polyethylene wt. % in the extrudable composition can depend on the final metallocene polyethylene wt. % in the extruded non-crosslinked polyethylene foam. The blowing agent can be a physical blowing agent or a chemical blowing agent. Chemical blowing agents via thermal decomposition above a specified temperature can liberate a gas. The gas can get mixed, dissolved, dispersed and/or emulsified in a polymer melt, and can get vaporized under pressure drop when the polymer melt is extruded through a die, forming a foam. In some aspects, the chemical blowing agent can contain hydrocerol, a bicarbonate such sodium bicarbonate and/or zinc bicarbonate, a nitrogen containing blowing agent such as azodicarbonamide, or any combination thereof. In some particular aspects, the extrudable composition can be formed by providing a composition containing the metallocene polyethylene, a chemical blowing agent and optionally the LDPE, heating the composition to melt the polymer and decompose the chemical blowing agent to form the extrudable composition. The composition containing the metallocene polyethylene, chemical blowing agent and optionally the LDPE can be formed by dry mixing of the ingredients. Gas liberated by thermal decomposition of the chemical blowing agent can get mixed, dissolved, dispersed and/or emulsified in the polymer melt, forming the extrudable composition. Physical blowing agents are gaseous compounds that are mixed, dissolved, dispersed and/or emulsified in a polymer melt, and can get vaporized under pressure drop when the polymer melt is extruded through a die, forming a foam. In some aspects, the physical blowing agent can contain carbon dioxide ($CO_2$), a hydrocarbon, nitrogen ($N_2$), a hydrofluorocarbon (HFC), a hydrofluoroolefin (HFO), or any combination or blends thereof. In some particular aspects, the extrudable composition can be formed by melting a composition containing the metallocene polyethylene and optionally the LDPE to form a polymer melt, and mixing, dissolving, dispersing and/or emulsifying a physical blowing agent such as $CO_2$ in the polymer melt to form the extrudable composition. The composition containing the metallocene polyethylene and optionally the LDPE can be formed by dry mixing of the metallocene polyethylene and optional LDPE. In some aspects, the physical blowing agent can be mixed, dissolved, dispersed and/or emulsified in the polymer melt relatively homogeneously. The extrudable composition, before extrusion through the die, can be kept under a pressure high enough to relatively or sufficiently prevent the physical blowing agent or the gas from the decomposed chemical blowing agent to expand prematurely from the extrudable composition. Upon extrusion through the die the pressure decreases to atmospheric pressure and the physical blowing agent or the gas from the decomposed chemical blowing agent in the polymer melt expands the polymer to form the foam. In some particular aspects, the blowing agent can be $CO_2$. The extrudable composition can contain less than 10 wt. %, such as 0.25 wt. % to 3 wt. % or at least any one of, equal to any one of, or between any two of 0.25, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5 and 3 wt. % of the blowing agent such as $CO_2$. In some aspects, the extrudable composition, before extrusion through the die, can be kept at a temperature just above the crystallization temperature of the metallocene polyethylene. In some particular aspects, the extrudable composition before extrusion can be kept at i) a temperature 220° F. to 280° F. or at least any one of, equal to any one of, or between any two of 220° F., 230° F., 240° F., 250° F., 260° F., 270° F. and 280° F. and/or at ii) a pressure 350 psi to 3000 psi or at least any one of, equal to any one of, or between any two of 350 psi, 500 psi, 1000 psi, 1500 psi, 2000 psi, 2500 psi, and 3000 psi, and can be extruded to atmospheric conditions. In some aspects, the extrudable composition can further contain a nucleating agent. Nucleating agents are compounds that form nuclei or provide sites for cell formation and cell growth. The nucleating agents can increase cell density in the extruded non-crosslinked polyethylene foam. In some particular aspects, the nucleating agent can contain silica, talcum, a mixture of sodium bicarbonate and citric acid, an amine, an amide such as an amide of an unsaturated aliphatic ($C_{10}$-$C_{34}$) carboxylic acid such as ethylene bis stearamide, an ester such as an ester of an unsaturated aliphatic ($C_{10}$-$C_{34}$) carboxylic acid, a clay such as montmorillonite, maleic anhydride, calcite, sepiolite, carbon nanotubes such as multi-walled carbon nanotube, PTFE, clay or any combination thereof. In some aspects, the composition can contain 0.1 wt. % to 4 wt. % or at least any one of, equal to any one of, or between any two of 0.25, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5 and 4 wt. % of the nucleating agent. In some aspects, the extrudable composition can further include an additive selected from the group an antioxidant, a processing aid, a plasticizer, a flow modifier, or any combination or blends thereof. In some aspects, the extrudable composition can contain 0.1 wt. % to 4 wt. % or at least any one of, equal to any one of, or between any two of 0.25, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5 and 4 wt. % of the additive.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Pellets of a Lumicene® mPE EC045D, a metallocene polyethylene with density of 0.927 g/cc and $MI_2$ 4.5 g/10 min at 2.16 kg, 190° C., were supplied from a hopper into a barrel of a polymer extruder. Gaseous $CO_2$ was injected into the melted polymer in the barrel. The melted polymer containing about 1 wt. % of $CO_2$ was kept under a pressure in the barrel and was extruded through a die by a screw in the barrel, to form a foam by pressure drop. The extruded foam formed had a density of 0.14 g/cc, a closed cell content of 90%, average cell diameter of 0.9 mm and an expansion ratio of 4:1. FIG. 1 shows the cell structure of the extruded non-crosslinked polyethylene foam at magnification of 250×.

Example 2

Two blends using 70% of metallocene polyethylene grades Lumicene® mPE M2314EP (mPE-1) and Lumicene® mPE M4041UV (mPE-2) respectively and 30% of a low density polyethylene (LDPE) grade (density of 0.920 g/cc and $MI_2$ 1.7 g/10 min at 2.16 kg, 190° C.) were extruded into foam using $CO_2$ as a blowing agent. Lumicene® mPE M2314EP is a metallocene polyethylene with density of 0.923 g/cc and $MI_2$ 1.4 g/10 min at 2.16 kg, 190° C. Lumicene® mPE M4041UV is a metallocene polyethylene with density of 0.941 g/cc and $MI_2$ 4.0 g/10 min at 2.16 kg, 190° C. An extruded foam was also produced using just the low density polyethylene (LDPE) grade as a comparative reference. TABLE 1 presents foam density, closed cell content, compression modulus and compression strength for the three extruded foams. As shown in TABLE 1, the extruded foam containing the metallocene polyethylene grades show relatively low density and high closed cell content along with higher compression modulus and strength.

TABLE 1

|  | Example 2.1 | Example 2.2 | Example 2.3 |
|---|---|---|---|
| Blend | LDPE | 70% mPE-1 + 30% LDPE | 70% mPE-2 + 30% LDPE |
| Density (g/cm³) | 0.206 | 0.218 | 0.204 |
| Closed Cell Content (%) | 77% | 96% | 94% |
| Compression Modulus (psi) | 1655 | 1690 | 2535 |
| Compression Strength at Yield (psi) | 35.78 | 46.35 | 63.86 |

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A polyethylene foam consisting of:
at least 60 wt. % of a metallocene polyethylene having a density of 0.918 g/cc to 0.930 g/cc, as measured in accordance with ASTM D792 and a melt index ($MI_2$) of 0.2 to 5.5 g/10 min at 2.16 kg, 190° C., as measured in accordance with ASTM D1238;
a low density polyethylene (LDPE) having a density of 0.915 g/cc to 0.925 g/cc;
optionally a blowing agent; and
optionally an additive,
wherein the polyethylene foam:
has a density of 0.04 to 0.35 g/cc;
has a closed cell content of at least 85%; and
is an extruded non-crosslinked polyethylene foam.

2. The polyethylene foam of claim 1, comprising the blowing agent, wherein the blowing agent is a chemical blowing agent.

3. The polyethylene foam of claim 2, wherein the chemical blowing agent is selected from a hydrocerol, a bicarbonate, or a nitrogen containing blowing agent, or any combination thereof.

4. The polyethylene foam of claim 1, wherein the foam has a density of 0.04 g/cc to 0.22 g/cc.

5. The polyethylene foam of claim 1, comprising 20 to 40 wt. % of the LDPE polymer having the density of 0.915 g/cc to 0.925 g/cc.

6. The polyethylene foam of claim 1, wherein the polyethylene foam has an average cell diameter of 0.5 mm to 2.5 mm.

7. The polyethylene foam of claim 1, wherein the polyethylene foam is in the shape of a sheet, a roll, a sphere or a cube.

8. A method for making the polyethylene foam of claim 1, the method comprising extruding a composition comprising at least 60 wt. % of the metallocene polyethylene, the low density polyethylene (LDPE) having a density of 0.915 g/cc to 0.925 g/cc; and a blowing agent to produce the polyethylene foam.

9. The method of claim 8, wherein the blowing agent is a physical blowing agent.

10. The method of claim 8, wherein the blowing agent comprises carbon dioxide ($CO_2$), a hydrocarbon, nitrogen ($N_2$), a hydrofluorocarbon (HFC), or a hydrofluoroolefin (HFO), or any combination thereof.

11. A polyethylene foam consisting of:
at least 60 wt. % of a metallocene polyethylene having a density of 0.918 g/cc to 0.930 g/cc, as measured in accordance with ASTM D792 and a melt index ($MI_2$) of 0.2 to 5.5 g/10 min at 2.16 kg, 190° C., as measured in accordance with ASTM D1238;
an additive selected from an antioxidant, a nucleator, a processing aid, a plasticizer, or a flow modifier, or blends thereof;
optionally a low density polyethylene (LDPE) having a density of 0.915 g/cc to 0.925 g/cc; and
optionally a blowing agent,
wherein the polyethylene foam:
has a density of 0.04 to 0.35 g/cc;
has a closed cell content of at least 85%; and
is an extruded non-crosslinked polyethylene foam.

12. A polyethylene foam consisting of:
at least 60 wt. % of a metallocene polyethylene having a density of 0,918 g/cc to 0.930 g/cc, as measured in accordance with ASTM D792 and a melt index ($MI_2$) of 0.2 to 5.5 g/10 min at 2.16 kg, 190° C., as measured in accordance with ASTM D1238, wherein the metallocene polyethylene is a blend of metallocene polyethylenes;
optionally a low density polyethylene (LDPE) having a density of 0.915 g/cc to 0.925 g/cc;
optionally a blowing agent; and
optionally an additive,
wherein the polyethylene foam:
has a density of 0.04 to 0.35 g/cc;
has a closed cell content of at least 85%; and
is an extruded non-crosslinked polyethylene foam.

* * * * *